United States Patent Office 3,205,184
Patented Sept. 7, 1965

3,205,184
METHOD OF MAKING COMPOSITE ION EXCHANGE RESIN BODIES
Melvin J. Hatch, Midland, Mich., assignor to The Dow Chemical Company, Midland, Mich., a corporation of Delaware
No Drawing. Filed Mar. 12, 1962, Ser. No. 179,252
17 Claims. (Cl. 260—2.1)

This application is a continuation-in-part of my copending application, Serial Number 475,003, filed December 13, 1954, now Patent Number 3,041,292.

This invention concerns a method of insolubilizing ionizable resins that normally are soluble in aqueous media so as to render them effective for use as ion exchange agents. It pertains more particularly to such a method wherein solid, water-insoluble, composite ion exchange resin bodies, each comprising the normally soluble ionizable resin, entrapped within and throughout the body of a solid, water-insoluble resin and thereby insolubilized, are produced and to certain of the composite ion exchange resin bodies obtainable by the method. The invention also pertains to said method as applied in making solid, insoluble, composite ion exchange resin bodies comprising, in a single piece thereof, two or more different ionizable resin components intimately mixed together throughout the piece, and it pertains especially to the method as applied in making amphoteric solid, insoluble composite ion exchange resin bodies of the nature just stated.

It is well known that ionizable materials, in order to be satisfactorily effective as ion exchange agents, must be both ionizable and insoluble, or practically insoluble, in the media in which they are used and a wide variety of cation exchange resins and of anoin exchange resins having this combination of properties are known. It sometimes happens that soluble cationic or anionic resins are available, or obtainable, at lower cost than cationic or anionic ion exchange resins, or that a soluble cationic or anionic resin possesses a greater selectivity toward chemically combining, e.g., to form a salt, with a given kind of ion present in a solution together with other ions having the same kind of electrical charge than conventional ion exchange resins and would be preferred, for treatment of the solution, over conventional ion exchange resins if it could be insolubilized in a manner rendering it effective as an ion exchange agent. Also, a method for insolubilizing normally soluble, e.g., water-soluble, ionizable resins to render them effective for use as ion exchangers in ion exchange processes would be of value in that it would enlarge upon the number and variety of ion exchange resins available.

It has been found that ionizable resins which normally are soluble in aqueous media, e.g., in water or in an aqueous solution of an acid, a base, or a salt, can be insolubilized by intimately mixing, or dissolving the normally soluble ionizable resin together with a substantially homogeneous liquid comprising one or more organic compounds that are polymerizable to form a solid, insoluble resin having a cross-linked molecular structure and subjecting the mixture to polymerization conditions.

The product thus formed is a solid, composite ion exchange resin body comprising, throughout a single piece of the same, an intimate mixture of the resulting cross-linked, insoluble resin having the normally soluble ionizable resin entrapped, and thus insolubilized, within its body. For convenience, such composite ion exchange resin bodies will from time to time hereinafter be termed "snake-cage" resins, since the normally soluble ionizable resin component may be visualized as a "snake" which is insolubilized by being entrapped by, and probably molecularly entangled with, the "cage" of the solid, insoluble, cross-linked resin that has been formed thereabout.

The method of the invention can be applied in making snake cage resins of any of several types, i.e., composite cation exchange resin bodies; or composite anion exchange resin bodies; or amphoteric composite ion exchange resin bodies comprising, in and throughout a single piece thereof, an intimate mixture of a resin component containing cation exchanging groups in its molecule and another and different resin component containing cation exchanging groups in its molecule. The simplest forms of the snake-cage resins preparable by the present method are composite cation exchange resins and composite anion exchange resins, each containing one or more ionizable resin components that are normally soluble in aqueous media and that are insolubilized by entrapment within the body of a solid, insoluble, cross-linked resin that is not of itself ionizable. These simplest forms of the snake-cage resins are disclosed for the first time in the present application and constitute certain of the embodiments of the present invention. The method of the invention can also be applied in making more complex snake-cage resins comprising both an ionizable "snake" and an ionizable "cage," or comprising both a cation-exchanging resin component and an anion-exchanging resin component (both of which may be "snake" components or one of which may be a "snake" and another the "cage" component) such as are disclosed in the hereinbefore mentioned copending application, Serial No. 475,003, now Patent No. 3,041,292, of which the present application is a continuation-in-part. The present invention privdes a novel method for making all such snake-cage resins, which method comprises forming the solid, insoluble, cross-linked "cage" resin in intimate mixture together with a preformed ionizable "snake" resin.

Any polymerizable organic material in liquid, or liquefied form, e.g., dissolved in an inert liquid medium, that is capable of being polymerized, through occurrence either of an addition type of polymerization reaction or through occurrence of a condensation type of polymerization reaction, to form a solid, insoluble, cross-linked resin can be used in the present process for formation of the "cage" component of a composite ion exchange resin body. Such a polymerizable liquid organic starting material, and also the "cage" resin formed therefrom, may be either nonionizable, or may contain in molecules thereof cation-exchanging groups, or anion exchanging groups, or both. A wide variety of organic materials, capable of readily being polymerized to form solid, insoluble cross-linked resins and, therefore, suitable for use in the method of the present invention, are well known in the art. Examples of such liquid polymerizable materials are aqueous solutions of both polyethyleneimine and epichlorohydrin, aqueous solutions of both N,N'-methylene-bis-acrylamide and ar-vinylbenzyltrimethylammonium chloride, aqueous solutions of both N,N'-methylene-bis-acrylamide and acrylamide, mixtures or aqueous solutions of both phenol and formaldehyde, mixtures of a major proportion by weight of styrene and a minor proportion, preferably less than 10 weight percent, of divinylbenzene, mixtures of a major proportion of styrene and minor proportions of ethylvinylbenzene and divinylbenzene, mixtures of ar-vinylbenzene sulfonic acid or an alkali salt thereof and divinylbenzene, and mixtures of ar-vinylbenzyltrimethylammonium chloride and 10 weight percent or less of divinylbenzene, etc.

Any of the ionizable organic polymers of high, or at least fairly high, molecular weight, e.g., having a molecular weight of 3000 or higher as determined by the well known Staudinger method, that is fairly soluble in an aqueous medium, such as water or an aqueous solution of an acid, a salt, or a base, can be used as a starting material in the present method to provide, i.e., serve as, the "snake" component of the snake-cage resin product. Such soluble and ionizable organic polymers possess linear molecular structures, e.g., a back bone of a carbon chain that may be branched, and are practically free of cross-linkages between the chain-like portions of the molecules. A variety of such normally soluble ionizable polymers, suitable for use in the method of the invention, are known in the art. Examples of such are polyacrylic acid and the alkali, i.e., the alkali metal and ammonium, salts thereof; polymethacrylic acid and its alkali salts; polymers of ar-vinylbenzene sulfonic acid and the alkali salts thereof; water-soluble nuclear sulfonated polystyrene and the alkali salts of the same; polymers of ar-vinylbenzylsulfonic acid and alkali salts of the same; water-soluble nuclear sulfonated polymers of ar-vinyltoluene and alkali salts of the same; water-soluble copolymers of styrene and maleic acid and alkali salts of the same; water-soluble polymers of ar-vinylbenzyltrimethylammonium chloride; and polyethyleneimine; etc.

Although any liquid or liquefied organic material that is polymerizable to form a solid, insoluble, cross-linked polymer can be used in the present method to form the "cage" resin component of the composite ion exchange resin products and any of the above-mentioned soluble and ionizable resins of substantially linear molecular structures can be used in the method to provide, i.e., serve as, the "snake" component of composite ion exchange resin products, the starting material employed for formation of the "cage" should be polymerizable and practically non-reactive with the soluble and ionizable polymer starting material (except that in instances in which one such starting material is cationic and the other anionic they may react to form a salt of one another) under the polymerization conditions employed in forming the "cage" component of the composite ion exchange resin product.

In practice of the invention, one or more of the hereinbefore mentioned normally soluble, ionizable resins is dissolved together with the organic starting material that is polymerizable to form a solid, insoluble resin having a cross-linked molecular structure. In instances in which the last mentioned starting material is a liquid and is a solvent for the normally soluble, ionizable resin or resins, no other liquid medium need be added to the mixture. However, an inert liquid medium can be added, e.g., as a diluent, and sometimes is required in order to serve as a mutual solvent for the above-mentioned starting materials. Any inert solvent which is mutually compatible with the ionizable polymer and the polymerizable starting materials can be used as a medium in the reaction mixture; hence, a suitable liquid medium can readily be chosen by a simple preliminary test. Water often can be used as the reaction medium and, when suitable, is preferred. Other liquids that can be used, together with the ionizable polymer and polymerizable starting materials that are inert therewith and soluble therein, are benzene, toluene, xylene, carbon tetrachloride, ethylene chloride, methanol, ethanol, acetone and dioxane, etc.

The above-mentioned starting materials can be used in any proportions to form a composite ion exchange resin product, but are preferably used in relative proportions such that the inert liquid solvent medium, if any, is present in amount sufficient to co-dissolve and form a liquid solution of the ionizable polymer and polymerizable starting materials and to dilute the mixture sufficiently to permit ready control of the temperature, e.g., so as to prevent spontaneous overheating, during polymerization of the polymerizable starting material. The mixture, i.e., the combined amount, of the ionizable polymer and polymerizable starting materials preferably contains sufficient ionizable groups to result, when solidified by polymerization, in formation of a composite ion exchange resin having an ion absorptive capacity of at least 0.5 gram milliequivalents per gram dry weight of the solvent-free composite ion exchange resin product.

A minor proportion, e.g., corresponding to between 0.05 and 5 percent of the weight of the polymerizable starting material, of a polymerization catalyst such as sodium persulfate, potassium persulfate, hydrogen peroxide, benzoyl peroxide, tertiary-butyl hydroperoxide, di-(tertiary-butyl)peroxide, azo-bis-isobutyronitrile, or a redox catalyst, etc., is usually dissolved in the reaction mixture, or the polymerization can be catalyzed by radiation with ultraviolet light or by gamma radiation, but the presence of a polymerization catalyst is not always required. Other additives such as plasticizers, lubricants, fillers, etc., may also be added to the reaction mixture, but are not required.

The mixture is brought to, or maintained at, a temperature such as to polymerize the polymerizable starting material and thus form a solid polymeric mass or body. The polymerization can be accomplished by direct heating of the above-described reaction mixture, or said mixture can be dispersed as droplets in a liquid body in which it and its components are relatively insoluble and the droplets be solidified by polymerization of the polymerizable material therein to form the composite ion exchange resin directly as small beads or granules. The polymerization sometimes occurs at room temperature, especially in instances in which the monomers undergo an addition, rather than condensation, type of polymerization reaction and a catalyst is present to accelerate the reaction. Often the material is heated, e.g., at from 40 to 100° C. or above, to accomplish the reaction at a fairly rapid rate.

The composite resin material thus formed is solid, but may sometimes be soft and gelatinous. When necessary, the composite resin product is separated, e.g., by decanting or filtering, from any remaining unabsorbed liquid and is heated to higher temperatures, e.g., from 100° to 250° C. or above, to further the polymerization and harden the product.

The composite ion exchange resin body is ground, pulverized, or otherwise comminuted, when necessary, to bring it to a granular form suitable for use as an ion exchange resin. It is thereafter washed thoroughly with water. In some instances there are intervening steps of conditioning the granules by washing them with an aqueous solution of a salt or other ionizable substance prior to the washing with water alone, but such intervening steps are not required. The water-washed granular product is in condition for use as an ion exchange agent, e.g. for the chemical absorption of ions from solutions contacted therewith, in usual ways.

In instances in which the composite ion exchange resin product is not amphoteric, i.e., is either a cation exchange resin or an anion exchange resin, it can, after becoming loaded with chemically absorbed ions through use in an ion exchange process, be regenerated only by treatment with a regenerating agent chemically reactive therewith such as an aqueous solution of an acid, a base, or a salt. However, when the composite ion exchange resin body is an amphoteric material containing an intimate mixture of a cation exchanging resin and of a different and anion exchanging resin throughout a granule thereof it can, after becoming thus loaded with chemically absorbed ions, be regenerated either by treatment with a chemically reactive regenerating agent such as an aqueous solution of an acid, a base, or a salt, or by merely being washed with water. In such water washing regeneration operation, the cation- and anion-exchanging resin components, presumably because of being intimately mixed together within the individual granules, appear to function as regenerating agents for one another, thus releasing chemically absorbed ions therefrom into the wash water. Such regeneration by washing with water may be carried out at any temperature at which the water is liquid, e.g., at from 0° to 100° C. at atmospheric pressure.

The following examples, illustrative of ways of practicing the invention, are not to be construed as limiting.

EXAMPLE 1

This example illustrates the preparation and testing of an amphoteric so-called "snake-cage" resin wherein the "snake" is polyacrylic acid and/or a salt thereof and the "cage" is an insoluble copolymer of N,N'-methylene-bis-acrylamide, $(CH_2\!\!=\!\!CHC\!\!-\!\!NH\!\!-\!)_2CH_2$, and ar-vinylbenzyltrimethylammonium chloride or hydroxide. This amphoteric composite ion exchange resin body was prepared by forming the cage about, e.g., around, the snake, and the resulting product was tested, as follows. Approximately 20 parts by weight of an aqueous solution of polyacrylic acid in 20.4 weight percent concentration, which solution had a viscosity of about 7,800 centipoises at 25° C., was added to a solution of 2 parts by weight of N,N'-methylene-bis-acrylamide and 12.6 parts by weight of ar-vinylbenzyltrimethylammonium chloride in water. The last-mentioned solution contained about 10 parts per million by weight of copper sulfate. The latter was present as a stabilizer of said solution against the possibility of prematurely undergoing polymerization and is not required. To the resulting mixture, 0.3 part by weight of sodium peroxydisulfate, $Na_2S_2O_8$, was added, after which the mixture was heated for 16 hours on a steam bath while bubbling nitrogen therethrough to maintain it in contact with a nitrogen atmosphere. During the heating, the N,N'-methylene-bis-acrylamide and ar-vinylbenzyltrimethylammonium chloride underwent copolymerization with a result that the mixture thickened to a gel. The gel was heated in a closed container at about 140° C. for 20 hours and then cooled and removed from the container. The product was a water-insoluble solid resin of brownish-color. It was ground to particles capable of passing through a 14 U.S. Standard mesh screen. The ground material was immersed in a 6-normal aqueous sodium hydroxide solution and the mixture was permitted to stand at room temperature for 64 hours and was then heated on a steam bath for 2 hours, for purpose of converting the polyacrylic acid component to its sodium salt and converting the quaternary ammonium chloride groups of the insoluble cross-linked copolymer component into quaternary ammonium hydroxide groups. The resin was then washed thoroughly with water so as to remove soluble materials, e.g., sodium chloride, excess sodium hydroxide and any sodium polyacrylate not insolubilized by entrapment in the resin particles, therefrom. Separate portions of the amphoteric composite ion exchange resin product thus prepared were analyzed and found to contain, per milliliter of a settled, water-wet bed of the granular resin: a total of approximately 0.78 gram milliequivalent of quaternary ammonium groups and a total of about 0.92 gram milliequivalent of carboxyl groups, e.g., in acid or salt form. It was further found that a one-milliliter settled, water-wet portion of the neutral, i.e., thoroughly water-washed, resin is capable of chemically absorbing approximately 0.77 gram milliequivalent of a salt such as sodium chloride or calcium chloride from an aqueous solution of the salt and of thereafter being regenerated to its neutral condition by being rinsed thoroughly with deionized water. Another portion of the water-wetted resin was centrifuged to remove external water therefrom, weighed, then dried thoroughly by heating to remove internal moisture from the granules and again weighed. The water-soaked resin was thereby found to contain 58 percent by weight of water within the granules. To a water-immersed 25 ml. bed of the neutral, water-washed amphoteric composite ion exchange resin (prepared as described above), which bed had a depth of 27 cm., there was fed, at a rate of 1.25 ml. per minute, a 2 ml. portion of an aqueous solution of sucrose and sodium chloride, which 2 ml. portion contained 0.66 gram of sucrose and 0.22 gram of sodium chloride. Water was then fed to the bed at the same flow rate. Liquor was thereby caused to flow through and from the bed at a corresponding rate. Starting with the first appreciable increase in the index of refraction of the effluent liquor over that of water alone, the liquor flowing from the bed during the above feeding operations was collected in successive fractions having the respective volumes indicated in the following table. The index of refraction at 35° C. of each such effluent liquor fraction was determined and the fraction was analyzed to determine the normality concentration of soluble chloride ions therein. The values obtained are given in the table.

Table

| No. | Effluent Liquor Fractions, Volume-cc. | $N_{35}^D$ | Chloride Concentration— Normality |
|---|---|---|---|
| 1 | 5 | 1.3306 | nil |
| 2 | 5 | 1.3314 | 0.002 |
| 3 | 5 | 1.3356 | 0.048 |
| 4 | 2.5 | 1.3374 | 0.081 |
| 5 | 2.5 | 1.3374 | 0.100 |
| 6 | 2.5 | 1.3370 | 0.110 |
| 7 | 2.5 | 1.3362 | 0.130 |
| 8 | 2.5 | 1.3351 | 0.156 |
| 9 | 2.5 | 1.3342 | 0.173 |
| 10 | 2.5 | 1.3336 | 0.167 |
| 11 | 5 | 1.3325 | 0.125 |
| 12 | 5 | 1.3318 | 0.072 |
| 13 | 5 | 1.3312 | 0.022 |

It will be noted that effluent liquor fractions 4 and 5 have higher index of refraction values than the other fractions and that fraction 9 has a higher chloride content than the other fractions. The occurrence in quite widely separated effluent liquor fractions of these two maximum values shows that a separation of the sucrose and sodium chloride solutes into different fractions of the effluent liquor had been accomplished to a considerable extent. The extent to which an index of refraction of such effluent liquor fraction is greater than that of water is due to the combined effects of sucrose and sodium chloride when both of these solutes are present in the liquor fraction. Accordingly, although the chloride normality values in the table indicate the concentrations of sodium chloride in the various fractions, the index of refraction values are only roughly indicative as to the relative concentrations of sucrose in the different fractions.

EXAMPLE 2

This example illustrates the preparation of another amphoteric composite ion exchange resin product, i.e., a so-called "snake-cage resin," by forming a cross-linked copolymer (of the chemical condensation type) of polyethyleneimine in the presence of preformed, normally water-soluble, sodium polyacrylate having a linear molecular structure and thereby insolubilizing the sodium polyacrylate by entrapment in the body of the insoluble cross-linked copolymer. A solution of sodium polyacrylate was made by neutralizing an aqueous 20 weight percent polyacrylic acid solution (having a viscosity of 7800 centipoises) with an equivalent amount of aqueous sodium hydroxide of 50 weight percent concentration. The resulting solution contained 2.2 gram milliequivalents of sodium polyacrylate per gram. To 4.2 grams of an aqueous solution of polyethyleneimine in approximately 50 weight percent concentration was added 9.8 grams of the sodium polyacrylate solution. To the resulting quite viscous solution, 2.5 ml. of epichlorohydrin was added with stirring. The solution thus formed was heated on a steam bath for 16 hours whereby a solid resin gel was formed. The gel was crushed and ground to small particles, capable of passing an 8 mesh U.S. Standard screen. The particulate resin product was washed thoroughly with water and permitted to settle as a water-wet bed. The bed volume was 55 ml. A portion of the water-soaked product was centrifuged to remove water from outer surfaces of the particles, weighed, and then oven-dried until of substantially constant weight to determine the initial water content of the resin particles. It was found that the water-soaked and externally dried particles contained 85.3 percent by weight of water. Through a bed of the water-wet resin about 50 bed volumes of a 0.1-normal aqueous calcium chloride solution was passed. The bed was then washed with water. This removed readily displaceable Ca and Cl ions from the amphoteric portions of the composite ion exchange resin, but left the calcium salt of that portion of the resin corresponding to the excess of carboxy resin groups over the amino groups in the composite resin body. Said composite ion exchange resin body was thereafter eluted with 10 bed volumes of a 1-normal hydrochloric acid solution. The eluate was analyzed to determine its content of calcium ions. On a basis of the analysis and the bed volume of resin employed, the residual cation exchange capacity (over and above the amphoteric ion exchange capacity) of the resin product was calculated as being approximately 0.20 gram milliequivalents per ml. of the water-wet resin bed.

EXAMPLE 3

This example illustrates the preparation of a strongly acidic cation exchange resin of the so-called "snake-cage" type, wherein the effective cation exchange resin component is a normally water-soluble polymer of nuclear sulfonated polyvinyltoluene (made by the nuclear sulfonation of a polymer of ar-vinyltoluene having an average molecular weight of about 180,000 as determined by the well-known Staudinger viscosity method) and the cage is an insoluble cross-linked copolymer of acrylamide and N,N'-methylene-bis-acrylamide, which cage is formed about the snake, i.e., the preformed sulfonated polyvinyltoluene, by dissolving acrylamide and N,N'-methylene-bis-acrylamide in a solution of the preformed sulfonated polyvinyltoluene and warming the resulting solution to copolymerize the acrylamide and N,N'-methylene-bis-acrylamide. The procedure just-mentioned results in the snake becoming entrapped, and thereby insolubilized, within and throughout the body of the insoluble and substantially neutral copolymer thus-formed. The composite ion exchange resin body thus-formed is insoluble in aqueous liquids, e.g., in water and in aqueous solutions of acids, bases, or salts, and is sufficiently permeable to aqueous liquids so that the sulfonated polyvinyltoluene component thereof is effective as a cation exchange agent. The procedure in preparing and testing this snake-cage cation exchange resin was as follows:

To a solution of 0.3 gram of potassium persulfate in 10 ml. of water there were added 4 grams of acrylamide and 2 grams of N,N'-methylene-bis-acrylamide. All except a small portion (estimated as less than 5 percent by volume of the solid compounds just added were dissolved by stirring and warming the mixture to 30° C. Approximately 95 percent by volume of the resulting clear solution was decanted into admixture with 5 grams of a water-soluble sodium salt of sulfonated polyvinyltoluene (which sulfonated polymer had been made by the nuclear sulfonation of polyvinyltoluene having an average molecular weight of about 180,000 as determined by the well-known Staudinger method). The mixture was stirred at about room temperature, whereupon the sodium polyvinyltoluene sulfonate dissolved with formation of a viscous (thick and syrup-like) solution. To this solution there was added a solution of 0.2 gram of $Na_2SO_3$ in 2 ml. of water. The mixture was stirred vigorously, whereupon it warmed spontaneously to about 60° C., due to occurrence of the copolymerization reaction, in from 1 to 3 minutes or thereabout after the $Na_2SO_3$ addition, and became thick and mushy. The mixture was then permitted to stand for 0.5 hour, without stirring and without deliberate external heating or cooling of the same, whereupon the polymerization continued with formation of a firm, rubbery gel-like product. The gel was sub-divided into particles capable of passing through an 8 mesh U.S. Standard screen and the particulate material was washed repeatedly with successive portions of water so as to remove any soluble material and excessively fine solid particles therefrom. The remaining particulate product was immersed in and shaken together with water for 64 hours. The particulate product was then permitted to settle, the water was poured off and the residual product was washed thoroughly with further portions of water. The product had a wet, settled, bed-volume of 39 ml. A 10 ml. portion of the bed was centrifuged to remove external water from the product particles. This externally dried portion of the particles weighed 6.03 grams. This same externally dried portion of the product (containing water within the individual product particles) was oven-dried to a practically constant weight for purpose of determining its water content, which was found to be 73.4 percent by weight. Another 5 ml. portion of the water-wetted settled bed of the product was washed successively with 200 ml. of water, 200 ml. of 1-normal hydrochloric acid, and then with another 200 ml. portion of water, after which it was immersed in an aqueous sodium chloride solution and was titrated with a 0.1-normal sodium hydroxide solution to the neutral point for purpose of determining its ion exchange capacity. It was found to have an ion exchange capacity of 0.35 gram milliequivalents per gram of the water-wet settled bed of the resin, or of 1.3 gram milliequivalents per gram, dry weight, of the resin. This ion exchange capacity appeared to be due entirely to the presence of highly ionized, i.e., sulfonate, groups in the product.

For purpose of comparison, 5 grams of the sodium salt of nuclear sulfonated polyvinyltoluene was dissolved in a solution of 0.3 gram of potassium persulfate in 10 ml. of water; the resulting solution was stirred together with a solution of 0.2 gram of $Na_2SO_3$ in water; and the then resulting solution was permitted to stand. No reaction appeared to take place, i.e., the sodium polyvinyltoluene remained in solution. Accordingly, it is evident that in the first of the experiments described in this example, the polyvinyltoluene sulfonate was insolubilized and rendered useful as a cation-exchange agent, by becoming entrapped in, i.e., intimately mixed throughout the body of, the insoluble, cross-linked copolymer of acrylamide and N,N'-methylene-bis-acrylamide that was formed in its presence.

EXAMPLE 4

This example illustrates the formation of a strongly basic anion exchange resin of the "snake-cage" type by entrapping, and thus insolubilizing, a preformed, normally water-soluble, strongly basic resin within and throughout the body of a substantially neutral, solid, water-insoluble, cross-linked resin that is formed in its presence.

A normally water-soluble homopolymer of ar-vinylbenzyl trimethylammonium chloride (prepared by polymerizing a mixture of the ortho- and para-isomers of vinylbenzyl chloride and reacting the polymer with trimethylamine), an aqueous solution of which homopolymer in 0.5 weight percent concentration and of sodium chloride in 2 weight percent concentration has a viscosity of 1.32 centipoises at 25° C., was caged by entrapment within, and throughout the body of, a solid, water-insoluble, cross-linked copolymer of acrylamide and N,N'-methylene-bis-acrylamide that was formed in its presence. Except for the kind of homopolymer starting material employed, the procedure in preparing this snake-cage resin product was similar to that described in Example 3. The water-insoluble snake-cage resin product was subdivided into particles capable of passing through an 8 mesh U.S. Standard screen and was tested to determine its properties and usefulness for anion exchanging purposes in accordance with usual and known procedures. The particulate product had a water-wet, settled-bed volume of 33 ml. A 10 ml. portion of the water-soaked particles, when freed of external water by centifuging, weighed 5.84 grams. The externally dried, but water soaked, particles of the product were found, by drying to constant weight, to contain approximately 74 percent by weight of water. The ion exchange capacity of the snake-cage resin product was determined by washing a 5 ml. portion of a settled bed of the water-wet resin successively with 500 ml. of water, 100 ml. of a 5-normal aqueous sodium chloride solution and with another 500 ml. of water and then titrating a slurry of the particulate resin in a dilute sulfuric acid solution to an end point with a 0.1-normal aqueous silver nitrate solution. Its ion exchange capacity was found to be 0.198 gram milliequivalents per gram of the water-soaked resin particles or 0.76 gram milliequivalents per gram, dry weight, of the snake-cake resin.

When an aqueous solution of the homopolymer of ar-vinylbenzyl trimethyl-ammonium chloride alone is treated with the same kinds and proportions of polymerization catalysts as were employed in the above experiment, said homopolymer remains dissolved and no reaction appears to occur. Accordingly, it is evident that in the first of the experiments described in this example, said normally water-soluble homopolymer was insolubilized, and rendered effective as an anion exchange agent, by becoming entrapped within the body of the insoluble cross-linked copolymer that was formed in its presence.

EXAMPLE 5

Another strongly basic anion exchange resin of the so-called "snake-cage" type was prepared by forming a "cage" of a solid, water-insoluble condensation polymer of polyethyleneimine and epichlorohydrine in admixture with a preformed water-soluble homopolymer of vinylbenzyl trimethylammonium chloride as the "snake." To 10 grams of a 50 weight percent aqueous solution of a homopolymer of vinylbenzyl trimethylammonium chloride (similar to that employed in Example 2), there was added 10 grams of an aqueous solution of polyethyleneimine in 43 weight percent concentration and 0.9 ml. of epichlorohydrin. The mixture was stirred and warmed to about 40° C. and then allowed to stand for 0.5 hour. It was then heated on a steam bath for 0.5 hour. A solid resin gel was thereby formed. It was ground to small particles, capable of passing an 8 mesh screen, washed thoroughly with water and allowed to settle as a water-wet bed. The bed volume was 145 ml. This water-insoluble snake-cage resin product will hereinafter be referred to as "product A."

In another experiment, another 1 gram portion of the above-mentioned homopolymer and 0.2 ml. of epichlorohydrin were dissolved in 1 gram of water and the solution was heated on a steam bath for 1 hour. The solution appeared to remain unchanged, i.e., a resin gel was not formed. It is evident, therefore, that in the first of these experiments the polyethyleneimine and epichlorohydrin reacted together to form a water-insoluble cross-linked resin "B" which was a component of "product A."

For purpose of comparison with product A, resin "B" was prepared individually by mixing 10 grams of an aqueous solution of polyethyleneimine in 43 weight percent concentration with 5 ml. of water and 0.9 ml. of epichlorohydrin and heating the resulting mixture under the conditions employed in preparing product A. The solid insoluble polymer gel which was formed was ground to particles capable of passing an 8 mesh screen, washed with water, and permitted to settle as a bed of the water-wet resin gel, which bed had a volume of 67 ml. This cross-linked polyethyleneimine material will hereinafter be referred to as "product B."

A portion of each of the water-wet resin products A and B was centrifuged to surface-dry the same, leaving only the water absorbed in the particles, and then weighed. Each such portion was then oven-dried to substantially constant weight and the percent loss in weight during drying, i.e., the initial percent absorbed water-content of the particles, was determined. A 20 ml. portion of a settled bed of each of the water-wet products A and B was separately washed successively with 500 ml. of water, 250 ml. of aqueous sodium carbonate solution containing 18 grams of $Na_2CO_3$, 250 ml. of a 5-normal sodium chloride solution, and 250 ml. of water for purpose of converting weakly basic groups of each such product from its salt, i.e., chloride, form to the free base form while leaving strongly basic (quaternary ammonium) groups of the product A in the chloride form. The washings from such treatment of each product were collected. Each of the thus-treated portions of products A and B was then separately washed with 250 ml. of an aqueous solution of sodium sulfate in 10 weight percent concentration for purpose of displacing remaining chloride ions from the respective products A and B. All such washings of product A were combined and all such washings of product B were combined. The chloride ion content of each of the combined washings of the respective products A and B was determined by titration with a standard aqueous silver nitrate solution. Each of the thus-treated portions of the products A and B was slurried together with a dilute sulfuric acid solution for purpose of liberating any remaining chloride ions from the product and the chloride content of each slurry was determined by titration with a standard silver nitrate solution. The chloride content of each slurry was low and represented only a few percent of the total ion exchange capacity of each of the products A and B as determined from the above-described combination of tests of the products, i.e., the above-mentioned washing operations removed 90 percent or more of the chloride ions initially possessed by each product. The total chloride ion exchange capacities of the resins, found by these tests of the respective products A and B, are summarized in the following table.

Table

| Ion Exchange Capacity | Product | |
|---|---|---|
| | A | B |
| Of settled bed of water-wet product on bed volume basis—gram milliequivalents/ml. | 0.088 | 0.049 |
| Of water-swollen externally dried product on weight basis—gram milliequivalents/gram | 0.157 | 0.090 |
| Of product on its dry weight basis—gram milliequivalents/gram | 1.65 | 0.60 |
| Weight percent water content of water-swollen, externally dried product | 90.5 | 85.0 |

It is estimated that of the total ion exchange capacity, i.e., 1.65 gram millequivalents per gram dry weight of the product A, 1.05 gram milliequivalents per gram is due to the presence of the normally water-soluble polymer, containing quaternary ammonium groups, as an entrapped, and thereby insolubilized, resin-component of product A.

I claim:

1. A method of insolubilizing an ionizable organic resin that normally is soluble in aqueous media so as to render it effective for use as an ion exchanger in ion exchange processes, which method comprises forming a liquid solution of:

(1) said ionizable organic polymer, and
(2) an organic material that is polymerizable to form a solid, insoluble, cross-linked polymer distinct from the ionizable organic polymer employed as a starting material and polymerizing the polymerizable organic material present in the solution, whereby there is formed a solid, insoluble, composite ion exchange resin body comprising, throughout a single piece thereof, an intimate mixture of the normally soluble, ionizable resin starting material and the solid, insoluble, cross-linked resin resulting from the polymerization.

2. A method, as claimed in claim 1, wherein the liquid solution comprises an inert mutual solvent for the ionizable organic polymer starting material and the polymerizable organic starting material.

3. A method, as claimed in claim 1, wherein the liquid solution comprises a polymerization catalyst.

4. A method, as claimed in claim 1, wherein the liquid solution comprises both a polymerization catalyst and an inert mutual solvent for the ionizable organic polymer starting material and the polymerizable organic starting material.

5. A method, as claimed in claim 1, wherein both the polymerizable organic starting material and the solid, insoluble, cross-linked polymer component formed therefrom are non-ionizable.

6. A method, as claimed in claim 1, wherein the ionizable organic polymer starting material is cationic.

7. A method, as claimed in claim 1, wherein the ionizable organic polymer starting material is anionic.

8. A method, as claimed in claim 1, wherein the polymerizable organic starting material comprises ionizable groups in molecules thereof and the solid, insoluble, cross-linked polymer component formed therefrom is ionizable.

9. A method, as claimed in claim 1, wherein both the ionizable organic polymer starting material and the polymerizable organic starting material contain ion exchanging groups in molecules thereof, the ion exchanging groups of one of these starting materials being cationic and those of the other being anionic, so that the polymerization of the polymerizable organic starting material results in formation of a solid, insoluble composite ion exchange resin body which is amphoteric.

10. A method, as claimed in claim 1, wherein the ionizable polymer starting material is a polyacrylate and the polymerizable organic starting material is a mixture of N,N'-methylene-bis-acrylamide and an ar-vinylbenzyltrimethylammonium compound.

11. A method, as claimed in claim 1, wherein the ionizable polymer starting material is a polyacrylate and the polymerizable organic starting material is a mixture of polyethyleneimine and epichlorohydrin.

12. A method, as claimed in claim 1, wherein the ionizable polymer starting material is a nuclear sulfonated poly-vinylaromatic hydrocarbon and the polymerizable organic starting material is a mixture of acrylamide and N,N'-methylene-bis-acrylamide.

13. A method, as claimed in claim 1, wherein the ionizable polymer starting material is a homopolymer of an ar-vinylbenzyltrimethylammonium compound and the polymerizable organic starting material is a mixture of acrylamide and N,N'-methylene-bis-acrylamide.

14. A method, as claimed in claim 1, wherein the ionizable polymer starting material is a homopolymer of an ar-vinylbenzyltrimethylammonium salt and the polymerizable organic starting material is a mixture of polyethyleneimine and epichlorohydrin.

15. A solid, insoluble, composite ion exchange resin body comprising throughout a single piece thereof, an intimate mixture of an ionizable organic polymer that normally is soluble in aqueous media, and a solid, insoluble, cross-linked and non-ionizable polymer, said ionizable organic polymer being insolubilized by being trapped within the body of the solid, insoluble, cross-linked and non-ionizable resin.

16. A solid, insoluble, composite ion exchange resin body, as claimed in claim 15, which is a cation exchange resin body.

17. A solid, insoluble, composite ion exchange resin body, as claimed in claim 15, which is an anion exchange resin body.

References Cited by the Examiner

UNITED STATES PATENTS

| | | | |
|---|---|---|---|
| 2,461,505 | 2/49 | Daniel | 260—2.1 X |
| 2,593,417 | 4/52 | D'Alelio | 260—2.2 X |
| 3,083,118 | 3/63 | Bridgeford | 260—2.2 |

FOREIGN PATENTS

| | | |
|---|---|---|
| 681,411 | 10/52 | Great Britain. |
| 728,508 | 4/55 | Great Britain. |

WILLIAM H. SHORT, *Primary Examiner.*

LEON J. BERCOVITZ, *Examiner.*